United States Patent
Liu

(10) Patent No.: US 12,483,998 B2
(45) Date of Patent: Nov. 25, 2025

(54) POWER ADJUSTMENT METHOD AND NODE DEVICE

(71) Applicant: VIVO MOBILE COMMUNICATION CO., LTD., Dongguan (CN)

(72) Inventor: Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 493 days.

(21) Appl. No.: 17/946,010

(22) Filed: Sep. 15, 2022

(65) Prior Publication Data

US 2023/0016972 A1    Jan. 19, 2023

Related U.S. Application Data

(63) Continuation of application No. PCT/CN2021/082479, filed on Mar. 23, 2021.

(30) Foreign Application Priority Data

Mar. 24, 2020   (CN) .......................... 202010215280.3

(51) Int. Cl.
*H04W 52/02*     (2009.01)
*H04W 52/24*     (2009.01)
(Continued)

(52) U.S. Cl.
CPC ....... *H04W 52/367* (2013.01); *H04W 52/241* (2013.01); *H04W 52/0203* (2013.01); *H04W 88/08* (2013.01)

(58) Field of Classification Search
CPC ... H04W 52/34; H04W 52/36; H04W 52/367; H04W 52/24; H04W 52/241;
(Continued)

(56) References Cited

U.S. PATENT DOCUMENTS

2019/0132847 A1   5/2019   Abedini et al.
2019/0215781 A1*  7/2019   Jeon ..................... H04W 52/241
(Continued)

FOREIGN PATENT DOCUMENTS

CN         105007617 A     10/2015
CN         110087296 A      8/2019
(Continued)

OTHER PUBLICATIONS

Extended European Search Report issued in related European Application No. 21774797.1, mailed Aug. 3, 2023, 10 pages.
(Continued)

*Primary Examiner* — Warner Wong
(74) *Attorney, Agent, or Firm* — IPX PLLC

(57) ABSTRACT

A power adjustment method and a node device are provided. The method, performed by a first Integrated Access Backhaul (IAB) node device, includes: reporting a power adjustment parameter to a target device. The power adjustment parameter is used for indicating a target power value. The power adjustment parameter is used for adjusting a transmit power of a second IAB node device. The target power value includes at least one of the following: a first power value or a second power value. The first power value is a received power value expected by a first IAB node device. The second power value is a transmit power value or a transmit power adjustment value of the second IAB node device suggested by the first IAB node device. The target device includes the second IAB node device or an IAB control node device.

17 Claims, 5 Drawing Sheets

(51) Int. Cl.
*H04W 52/36* (2009.01)
*H04W 88/08* (2009.01)

(58) Field of Classification Search
CPC ..... H04W 88/00; H04W 88/08; H04W 88/12; H04W 52/00; H04W 52/0203; H04W 52/04; H04W 52/143; H04W 52/247; H04W 52/383; H04W 92/00; H04W 92/12; H04W 92/22; H04L 12/2856; H04L 12/2858
See application file for complete search history.

(56) References Cited

U.S. PATENT DOCUMENTS

| | | | | |
|---|---|---|---|---|
| 2020/0045645 | A1* | 2/2020 | Chopra | H04W 52/228 |
| 2020/0053655 | A1* | 2/2020 | Ghosh | H04W 88/10 |
| 2020/0107362 | A1* | 4/2020 | Qi | H04W 88/085 |
| 2020/0336986 | A1* | 10/2020 | Chen | H04W 52/46 |
| 2021/0168728 | A1* | 6/2021 | Liu | H04L 5/0048 |
| 2021/0274449 | A1* | 9/2021 | Choi | H04W 88/14 |
| 2021/0289495 | A1* | 9/2021 | Korhonen | H04W 72/0446 |
| 2021/0345321 | A1* | 11/2021 | Wu | H04W 16/10 |
| 2021/0345324 | A1* | 11/2021 | Liu | H04W 52/242 |
| 2022/0007297 | A1* | 1/2022 | Zheng | H04W 88/14 |
| 2022/0007309 | A1* | 1/2022 | Dortschy | H04W 52/16 |
| 2022/0015040 | A1* | 1/2022 | Dortschy | H04W 52/16 |
| 2022/0060995 | A1* | 2/2022 | Chopra | H04W 52/245 |
| 2022/0330176 | A1* | 10/2022 | Kowalski | H04W 52/325 |
| 2023/0071471 | A1* | 3/2023 | Park | H04B 17/318 |
| 2023/0078181 | A1* | 3/2023 | Ghanbarinejad | H04W 52/325 370/318 |
| 2023/0080162 | A1* | 3/2023 | Ghanbarinejad | H04W 52/46 455/522 |

FOREIGN PATENT DOCUMENTS

| | | | |
|---|---|---|---|
| CN | 110831135 A | 2/2020 | |
| CN | 111901858 | * 11/2020 | ............ H04W 52/10 |
| EP | 3310090 A1 | 4/2018 | |
| EP | 3512265 A1 | 7/2019 | |
| EP | 3528398 A1 | 8/2019 | |
| WO | 2019029381 A1 | 2/2019 | |
| WO | 2019214501 A1 | 11/2019 | |
| WO | 2020029868 A1 | 2/2020 | |

OTHER PUBLICATIONS

International Search Report issued in corresponding International Application No. PCT/CN2021/082479, mailed Jun. 20, 2021, 4 pages.

Huawei et al., Physical Layer Design for NR IAB, 3GPP TSG RAN WG1 Meeting #95, R1-1812198, Nov. 16, 2018, 15 pages.

* cited by examiner

POWER ADJUSTMENT METHOD AND NODE DEVICE

CROSS-REFERENCE TO RELATED APPLICATION

This application is a continuation of International Application No. PCT/CN2021/082479, filed on Mar. 23, 2021, which claims priority to Chinese Patent Application No. 202010215280.3, filed on Mar. 24, 2020. The entire contents of each of the above-referenced applications are expressly incorporated herein by reference.

TECHNICAL FIELD

This application relates to the field of communications technologies, and in particular, to a power adjustment method and a node device.

BACKGROUND

Currently, a commonly used Integrated Access Backhaul (IAB) system may include an IAB control center, at least one IAB node device, and at least one User Equipment (UE). One IAB node device includes a Distributed Unit (DU) function part and a Mobile Termination (MT) function part.

In the related art, when the DU and the MT in the IAB node device simultaneously receive signals, the magnitude of a received power of the DU needs to be close to that of the MT in a case that the DU and the MT share a set of Radio Frequency (RF)/panel, or otherwise, imbalance between received Power Spectrum Densities (PSDs) of the DU and the MT may occur, affecting demodulation performance of the DU or the MT in the IAB node device. In addition, a signal transmitted by a parent node device of the IAB node device to the MT may interfere with reception by the DU in the IAB node device in a case that the DU and the MT in the IAB node device simultaneously receive signals, and a signal transmitted by the DU may interfere with reception by the MT in a case that the DU transmits the signal and the MT receives the signal.

SUMMARY

According to a first aspect, an embodiment of the present disclosure provides a power adjustment method, applied to a first IAB node device, the method including: reporting a power adjustment parameter to a target device, where the power adjustment parameter is used for indicating a target power value; the power adjustment parameter is used for adjusting a transmit power of a second IAB node device; the target power value includes at least one of the following: a first power value or a second power value; the first power value is a received power value expected by the first IAB node device; the second power value is a transmit power value or a transmit power adjustment value of the second IAB node device suggested by the first IAB node device; the target device includes the second IAB node device or an IAB control node device; and the second IAB node device is a parent node device of the first IAB node device.

According to a second aspect, an embodiment of the present disclosure provides a power adjustment method, applied to a second IAB node device, the method including: obtaining a power adjustment parameter; and adjusting a transmit power of the second IAB node device according to the power adjustment parameter, where the power adjustment parameter is used for indicating a target power value; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

According to a third aspect, an embodiment of the present disclosure provides a power adjustment method, applied to an IAB control node device, the method including: reporting a power adjustment parameter to a second IAB node device, where the power adjustment parameter is used for indicating a target power value; the power adjustment parameter is used for adjusting a transmit power of a second IAB node device; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

According to a fourth aspect, an embodiment of the present disclosure provides an IAB node device, the IAB node device being a first IAB node device, including: a reporting module, configured to report a power adjustment parameter to a target device, where the power adjustment parameter is used for indicating a target power value; the power adjustment parameter is used for adjusting a transmit power of a second IAB node device; the target power value includes at least one of the following: a first power value or a second power value; the first power value is a received power value expected by a first IAB node device; the second power value is a transmit power value or a transmit power adjustment value of the second IAB node device suggested by the first IAB node device; the target device includes the second IAB node device or an IAB control node device; and the second IAB node device is a parent node device of the first IAB node device.

According to a fifth aspect, an embodiment of the present disclosure provides an IAB node device, the IAB node device being a second IAB node device, including: an obtaining module, configured to obtain a power adjustment parameter; and an adjustment module, configured to adjust a transmit power of the second IAB node device according to the power adjustment parameter obtained by the obtaining module, where the power adjustment parameter is used for indicating a target power value; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

According to a sixth aspect, an embodiment of the present disclosure provides an IAB node device, the IAB node device being an IAB control node device, including: a reporting module, configured to report a power adjustment parameter to a second IAB node device, where the power adjustment parameter is used for indicating a target power value; the power adjustment parameter is used for adjusting a transmit power of a second IAB node device; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

According to a seventh aspect, an embodiment of the present disclosure provides an IAB node device, including a processor, a memory, and a computer program stored in the memory and executable by the processor, the computer program, when executed by the processor, implementing the steps of the power adjustment method according to the first aspect or the second aspect.

According to an eighth aspect, an embodiment of the present disclosure provides an IAB control node device, including a processor, a memory, and a computer program stored in the memory and executable by the processor, the computer program, when executed by the processor, implementing the steps of the power adjustment method according to the third aspect.

According to a ninth aspect, an embodiment of the present disclosure further provides a computer-readable storage medium, storing a computer program, the computer program when executed by a processor, implementing the steps of the power adjustment method as described above.

DETAILED DESCRIPTION

The following clearly describes the technical solutions in the embodiments of the present disclosure in full with reference to the accompanying drawings in the embodiments of the present disclosure. Apparently, the described embodiments are merely some of but not all of the embodiments of the present disclosure. All other embodiments derived by a person of ordinary skill in the art based on the embodiments of the present disclosure without making any creative efforts fall within the protection scope of this application.

The technical solutions provided in the present disclosure are applicable to various communication systems, such as a 5G communication system, a future evolved system, or a multi-communication fusion system. A plurality of application scenarios may be included, for example, Machine to Machine (M2M), D2M, macro/micro communication, enhanced Mobile Broadband (eMBB), ultra Reliable and Low Latency Communication (uRLLC), massive Machine Type Communication (mMTC), and the like.

Figure 1:
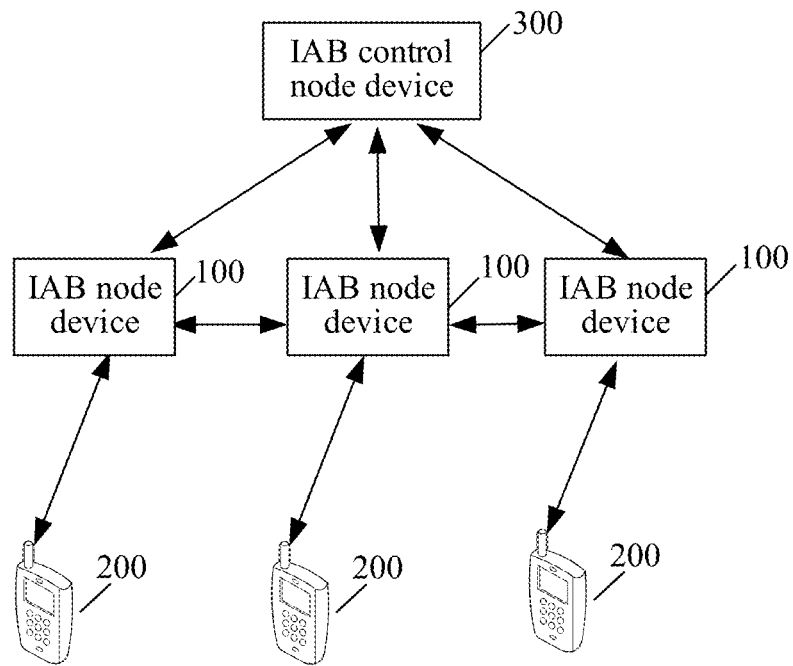
FIG. 1 is a possible schematic structural diagram 1 of a communication system involved in embodiments of the present disclosure.

FIG. 1 shows a possible schematic structural diagram of a communication system involved in embodiments of the present disclosure. As shown in FIG. 1, the communication system is an IAB system. The IAB system includes: at least one IAB node device 100, at least one UE 200, and an IAB control node device 300.

One IAB node device 100 includes a DU function part and an MT function part. The at least one IAB node device 100 includes a parent IAB node device and one or more child IAB node devices corresponding to the parent IAB node device. The node device may be referred to as a Centralized Unit (CU) in a case that the IAB control node device 300 is equipped with a control plane unit/control-plane protocol stack.

Exemplarily, by virtue of the MT, one IAB node device can find an upstream access point (which is a parent IAB node) and establish a wireless connection to a DU of the upstream access point. The wireless connection is referred to as a backhaul link. The IAB node device enables a DU function after establishing a complete backhaul link. The DU may provide cell services, that is, the DU may provide access services for the UE. One integrated access backhaul loop includes one donor IAB node device, where the donor IAB node device includes a wired transport network directly connected thereto.

Figure 2:
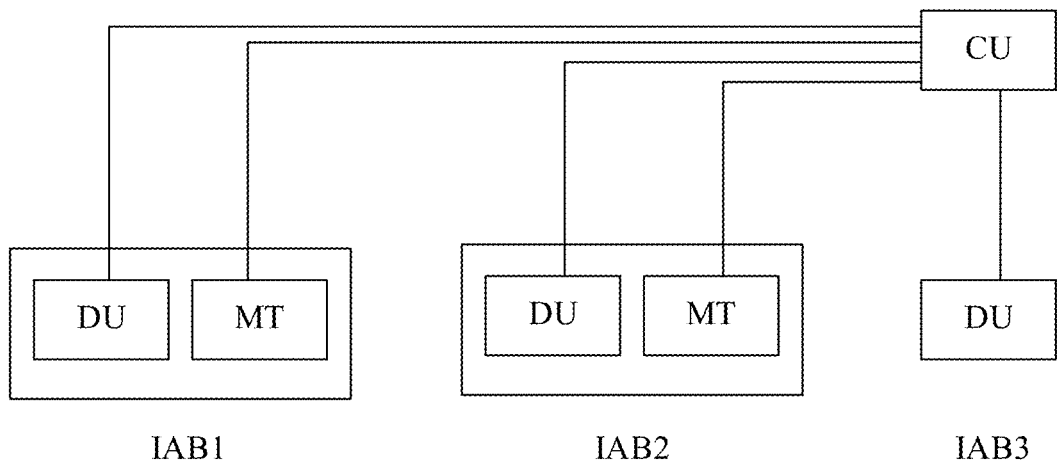
FIG. 2 is a possible schematic structural diagram 2 of a communication system involved in embodiments of the present disclosure.

FIG. 2 shows a schematic structural diagram of a CU-DU architecture of an IAB system involved in embodiments of the present disclosure. As shown in FIG. 2, in an integrated access backhaul loop, a DU in each IAB node device (which is briefly referred to as an IAB-DU below) may be connected to an IAB control node device, and an MT in the each IAB node device (which is briefly referred to as an IAB-MT below) may also be connected to the IAB control node device. Generally, the donor IAB node device does not include an MT. Exemplarily, the IAB control node device mainly configures the DU in the IAB node device through an F1-AP protocol. The IAB control node device configures the MT in the IAB node device through a Radio Resource Control (RRC) protocol.

In the related art, in DU Reception (DU-RX) and MT Reception (MT-RX) modes, a received power of the MT is equivalent to that of the DU, and expected demodulation performance of a receiver is optimal. However, when the UE is scheduled to perform uplink transmission, the received power of the DU is affected by a plurality of factors, for example, different UEs have different wireless quality environments and movement of the UE may cause a pathloss change. In this case, to cause received powers of the MT and the DU in the IAB node device to be equivalent, a transmit power of the scheduled UE and a downlink transmit power of the parent IAB node device need to be adjusted.

However, performance of radio frequency devices of the UE and the parent IAB node device greatly differ, for example, a maximum transmit power of the UE may be significantly less than the downlink transmit power of the DU of the parent IAB node device. In this case, the received powers of the MT and the DU cannot be ensured to be equivalent by adjusting the transmit power of the UE according to an uplink power control algorithm provided in the related art. Therefore, the downlink transmit power of the DU of the parent IAB node device needs to be further adjusted, to enable the received powers of the MT and the DU to be equivalent.

In some embodiments, there are mainly two manners of controlling a DL power under the IAB system in the related art.

A first power control manner is as follows:

The IAB-MT reports an expected received power thereof to the donor IAB node device, then the donor IAB node device obtains the expected received power reported by the IAB-MT and a pathloss between the donor IAB node device and the IAB-MT, and finally, the donor IAB node device performs DL transmit power control according to the expected received power of the IAB-MT and the pathloss.

A second power control manner is as follows:

The donor IAB node device performs downlink transmission, the IAB-MT performs link measurement and sends a power adjustment command to the donor IAB node device, and then the donor IAB node device performs DL transmit power control according to the power adjustment command.

In the first power control manner, the IAB-MT reports the expected received power thereof to the donor IAB node device. However, the received power expected by the IAB-MT may be semi-static or may be dynamically changed, and therefore, a corresponding reporting procedure needs to be specified. For a dynamic reporting mode, the expected received power needs to be directly reported to a parent node.

In the second power control manner, such a solution can effectively deal with scenarios where the received power value expected by the IAB-MT dynamically changes and a channel condition between the parent node and the IAB-MT dynamically changes. However, the IAB-MT needs to directly report to the parent node rather than the CU.

Based on the above, in the first power control manner and the second power control manner, an MT of one IAB node device performs transmission, measurement, and reporting to the donor IAB node device, to cause the donor IAB node device to adjust the downlink transmit power, so that a received power of the MT of the IAB node device is equivalent to that of the DU of the IAB node device. However, in a plurality of IAB networks, the donor IAB node device is not always an upstream IAB node device directly connected to one IAB node device. Therefore, such a power control manner based on the donor IAB node device does not always take effect. In addition, in the plurality of IAB networks, the reporting to the donor IAB node device relies on RRC signaling. Consequently, the delay is very high, and failure occurs because power control cannot keep up with a scheduling change.

In view of the foregoing problems, the embodiments of the present disclosure provide a power adjustment method and a node device. In terms of balance between a received power of an MT of a first IAB node device and a received power of a DU of a first IAB node device, the first IAB node device determines a received power expected by a parent node device of the first IAB node device and reports the expected received power (or adjustment of the expected received power) to a parent node device/CU, and then the parent node device/CU accordingly determines a downlink transmit power. In other words, the first IAB node device can control a DL transmit power of the parent node device to the first IAB node device by reporting the power, thereby alleviating the problems of PSD imbalance and interference.

In this embodiment of the present disclosure, a duplexing manner between the DU and MT of the IAB node device is divided into a half duplex manner and a full duplex manner. In the full duplex manner, the DU or MT of the IAB node device can simultaneously perform transmission and reception. Therefore, in an FDM or SDM multiplexing manner, transmission and reception operation modes of the DU and MT of the IAB node device are as follows:

a DU Transmission and MT Transmission (DU-TX & MT-TX) mode, or a mode where the DU is configured as DL and the MT is configured as UL;

a DU Reception and MT Reception (DU-RX & MT-RX) mode, or a mode where the DU is configured as UL and the MT is configured as DL;

a DU Transmission and MT Reception (DU-TX & MT-RX) mode, or a mode where the DU is configured as DL and the MT is configured as DL; or a DU Reception and MT Transmission (DU-RX & MT-TX) mode, or a mode where the DU is configured as UL and the MT is configured as UL.

In this embodiment of the present disclosure, a DU transmission mode is briefly referred to as DU-TX, a MT transmission mode is briefly referred to as MT-TX, a DU reception mode is briefly referred to as DU-RX, and a MT reception mode is briefly referred to as MT-RX.

Figure 3:
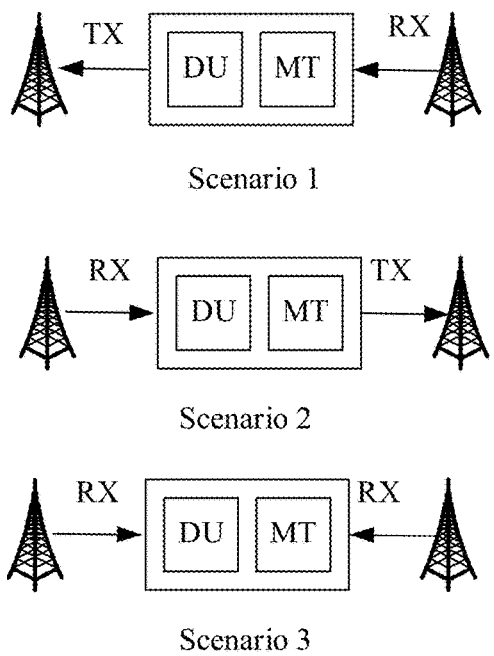
FIG. 3 is a schematic diagram of a scenario of interference between units in an IAB node device according to an embodiment of the present disclosure.

In this embodiment of the present disclosure, as shown in FIG. 3, interference cases of the DU and the MT of the IAB node device at least include the following scenarios:

In a scenario 1 (case 1), when IAB-DU transmission and IAB-MT reception are simultaneously performed, transmission of the IAB-DU may interfere with reception of the IAB-MT especially in a case that the IAB-DU and the IAB-MT share the same time-frequency resource (that is, in the FDM/SDM multiplexing manner).

In a scenario 2 (case 2), when IAB-DU reception and IAB-MT transmission are simultaneously performed, transmission of the IAB-MT may interfere with reception of the IAB-DU especially in a case that the IAB-DU and the IAB-MT share the same time-frequency resource (that is, in the FDM/SDM multiplexing manner).

In a scenario 3 (case 3), when IAB-DU reception and IAB-MT reception are simultaneously performed, a transmission signal transmitted to the IAB-DU may also leak to the IAB-MT, causing interference with reception of the IAB-MT, and vice versa, especially in a case that the IAB-DU and the IAB-MT share the same time-frequency resource (that is, in the FDM/SDM multiplexing manner).

In NR, in an information element of CSI-ReportConfig, a resourcesForChannelMeasurement field configures a reference signal for channel measurement, and a csi-IM-ResourcesForInterference field and/or a nzp-CSI-RS-ResourcesForInterference field configures resources for measurement interference.

In a case that only the resourcesForChannelMeasurement field is configured in signaling, the reference signal is measured only for L1-RSRP reporting. In a case that the resourcesForChannelMeasurement field and the csi-IM-ResourcesForInterference field and/or the nzp-CSI-RS-ResourcesForInterference field are configured in the signaling, measurement may be performed according to configuration information and a CQI is calculated and reported.

In this embodiment of the present disclosure, when an IAB node reports the CQI/CSI, the reporting may be performed with reference to the processes described above, and this is not limited in this embodiment of the present disclosure.

It is to be noted that, "1" herein means "or". For example, A/B may represent A or B. The term "and/or" used herein describes only an association relationship for describing associated objects and represents that three relationships may exist. For example, A and/or B may represent the following three cases: Only A exists, both A and B exist, and only B exists.

It is to be noted that, for ease of describing the technical solutions in the embodiments of this application clearly, terms such as "first" and "second" in the embodiments of this application are used to distinguish same or similar items with a basically same function and role. A person of ordinary skill in the art can understand that the terms such as "first" and "second" do not limit a quantity and an execution order. For example, a first power value and a second power value are used for distinguishing between different power values, but are not intended to indicate a particular order of the power values.

It is to be noted that, in the embodiments of the present disclosure, the term such as "exemplarily" or "for example" is used to represent giving an example, an illustration, or a description. Any embodiment or design scheme described as "exemplarily" or "for example" in the embodiments of the present disclosure should not be construed as being more preferred or having more advantages than other embodiments or design schemes. Exactly, the term such as "exemplarily" or "for example" is intended to present a related concept in a specific manner.

It is to be noted that, in the embodiments of this application, "of", "relevant" and "corresponding" may be interchangeable sometimes. It should be noted that the terms represent a same meaning if their differences are not emphasized. In the embodiments of this application, the term "a plurality of" means two or more.

Figure 4:
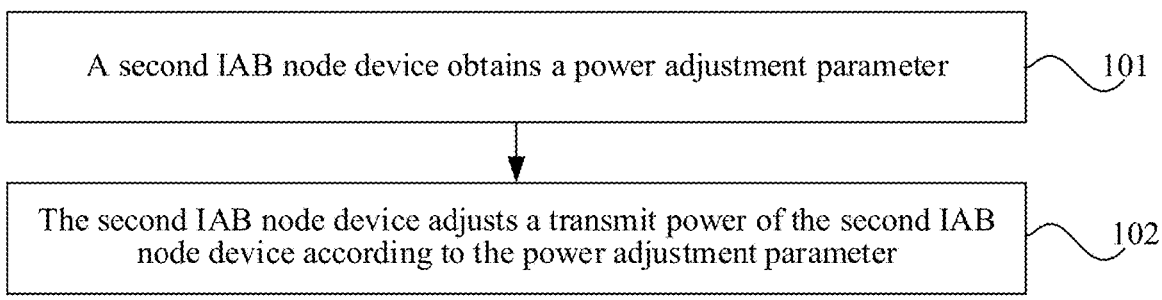
FIG. 4 is a schematic flowchart 1 of a power adjustment method according to an embodiment of the present disclosure.

FIG. 4 shows a schematic flowchart of a power adjustment method according to an embodiment of the present disclosure. As shown in FIG. 4, the power adjustment method may include steps 101 and 102:

Step 101: A second IAB node device obtains a power adjustment parameter.

Step 102: The second IAB node device adjusts a transmit power of the second IAB node device according to the power adjustment parameter.

In this embodiment of the present disclosure, the power adjustment parameter is used for indicating a target power value and adjusting the transmit power of the second IAB node device.

In this embodiment of the present disclosure, the target power value includes at least one of the following: a first power value or a second power value; the first power value is a received power value expected by a first IAB node device; and the second power value is a transmit power value or a transmit power adjustment value of the second IAB node device suggested by the first IAB node device.

In this embodiment of the present disclosure, the target device includes the second IAB node device or an IAB control node device, and the second IAB node device is a parent node device of the first IAB node device. Exemplarily, the IAB control node device may be a donor gNB.

For example, in this embodiment of the present disclosure, the target power value includes at least one of the following: a Reference Signal Received Power (RSRP), a Received Signal Strength Indication (RSSI), Reference Signal Received Quality (RSRQ), a Signal to Interference plus Noise Ratio (SINR), a Signal-to-Noise Ratio (SNR), Energy Per Resource Element (EPRE), or a PSD.

Exemplarily, the RSRP may be an RSRP of a Synchronization Signal and PBCH Block (SSB) or a CSI Reference Signal (CSI-RS), and the RSSI may be an RSSI of the SSB or the CSI-RS.

For example, in this embodiment of the present disclosure, the first power value may be a power value, or a plurality of power values, or a maximum power value, or a minimum power value, or a power range.

For example, in this embodiment of the present disclosure, the second power value may be a power value, or a plurality of power values, or a maximum power value, or a minimum power value, or a power range.

For example, in this embodiment of the present disclosure, the power adjustment parameter includes a power difference between a third power value and the target power value, where the third power value includes: a target power value initially reported or configured, a target power value reported or configured at the last time, and an actual power value.

It is to be noted that, the actual power value can be reported together with an actual received power value.

In an example, for the first power value, the actual power value may be a difference between an expected received power value and the actual received power value, for example, a difference between an expected received power value for IAB-MT reporting or configuration and the actual received power value.

For example, in this embodiment of the present disclosure, the power adjustment parameter includes a power value index of the target power value.

Exemplarily, in a case that a plurality of power values are obtained by the second IAB node device, the second IAB node device may determine, based on the power value index, an application power value indicated by the power value index as the target power value.

For example, in this embodiment of the present disclosure, a manner of obtaining the power adjustment parameter by the second IAB node device includes at least one of the following:

First manner: The first IAB node device directly reports the power adjustment parameter to the second IAB node device.

Second manner: The first IAB node device reports the power adjustment parameter to the IAB control node device.

Third manner: The IAB control node device autonomously determines the power adjustment parameter and then configures the power adjustment parameter for the second IAB node device, for example, the IAB control node device may perform configuration through RRC signaling or F1-C signaling or a BAP Control PDU.

Based on FIG. 4, another power adjustment method is provided in this embodiment of the present disclosure. The power adjustment method may include step 201:

Step 201: A first IAB node device reports a power adjustment parameter to a target device.

Figure 5:
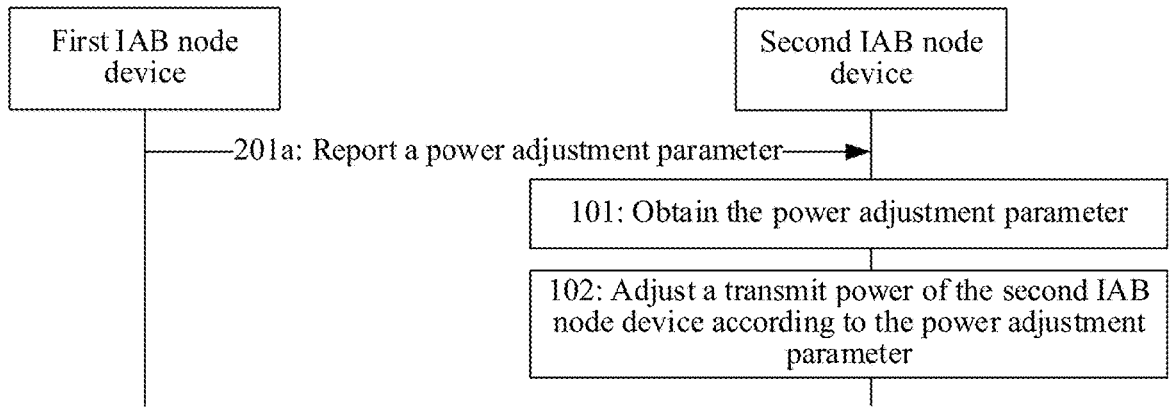
FIG. 5 is a schematic flowchart 2 of a power adjustment method according to an embodiment of the present disclosure.

Exemplarily, referring to FIG. 4, as shown in FIG. 5, in a case that the target device is a second IAB node device, step 201 may include step 201a: The first IAB node device reports the power adjustment parameter to the second IAB node device.

Exemplarily, in a case that the target device is an IAB control node device, the first IAB node device may report a power adjustment parameter to the IAB control node device, to enable the IAB control node device to transmit the power adjustment parameter to the second IAB node device, so that the second IAB node device can adjust a transmit power based on the power adjustment parameter.

For example, in this embodiment of the present disclosure, step 201 may include step 201*b*:

Step 201*b*: The first IAB node device reports the power adjustment parameter to the target device in at least one piece of third signaling at an initial access stage.

Exemplarily, in this embodiment of the present disclosure, it may be specified in a protocol that the reporting of the power adjustment parameter is performed in one/more pieces of third signaling at the initial access stage, for example, Msg.1 or Msg.3

Figure 6:
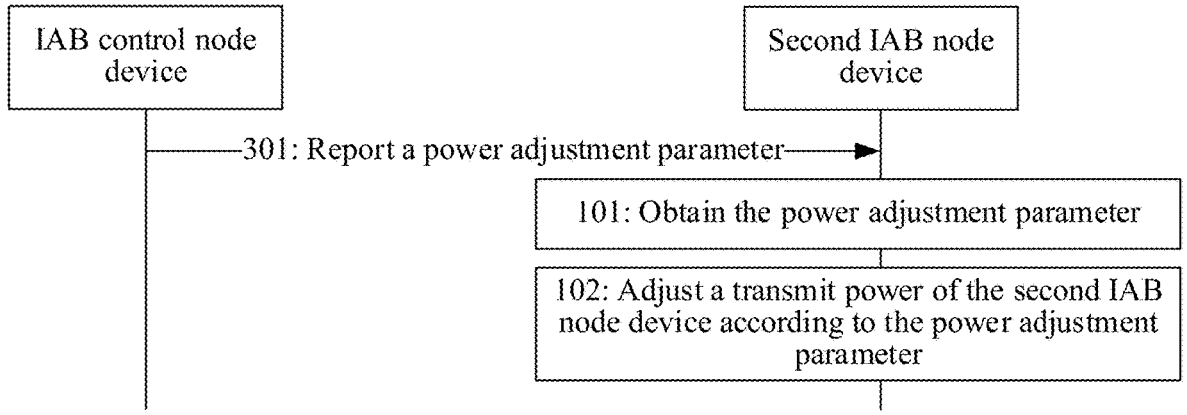
FIG. 6 is a schematic flowchart 3 of a power adjustment method according to an embodiment of the present disclosure.

Referring to FIG. 4, another power adjustment method is provided in this embodiment of the present disclosure. As shown in FIG. 6, the power adjustment method may include step 301:

Step 301: The IAB control node device reports a power adjustment parameter to the second IAB node device.

For example, in this embodiment of the present disclosure, before step 301, the power adjustment method provided in this embodiment of the present disclosure further includes step 301*a*:

Step 301*a*: The IAB control node device receives a power adjustment parameter from the first IAB node device.

For example, in this embodiment of the present disclosure, the power adjustment parameter is autonomously determined by the IAB control node device.

In the power adjustment method provided in the embodiments of the present disclosure, in terms of balance between a received power of an MT of a first IAB node device and a received power of a DU of a first IAB node device, the first IAB node device determines a received power expected by a parent node device of the first IAB node device and reports the expected received power (or adjustment of the expected received power) to a parent node device/IAB control node device, and then the parent node device/IAB control node device accordingly determines a downlink transmit power. In other words, the first IAB node device can control a DL transmit power of the parent node device to the first IAB node device by reporting the power, thereby alleviating the problems of PSD imbalance and interference.

The solutions provided in the embodiments of the present disclosure are described in detail below with reference to the power adjustment method shown in FIG. 2 to FIG. 4.

Figure 7:
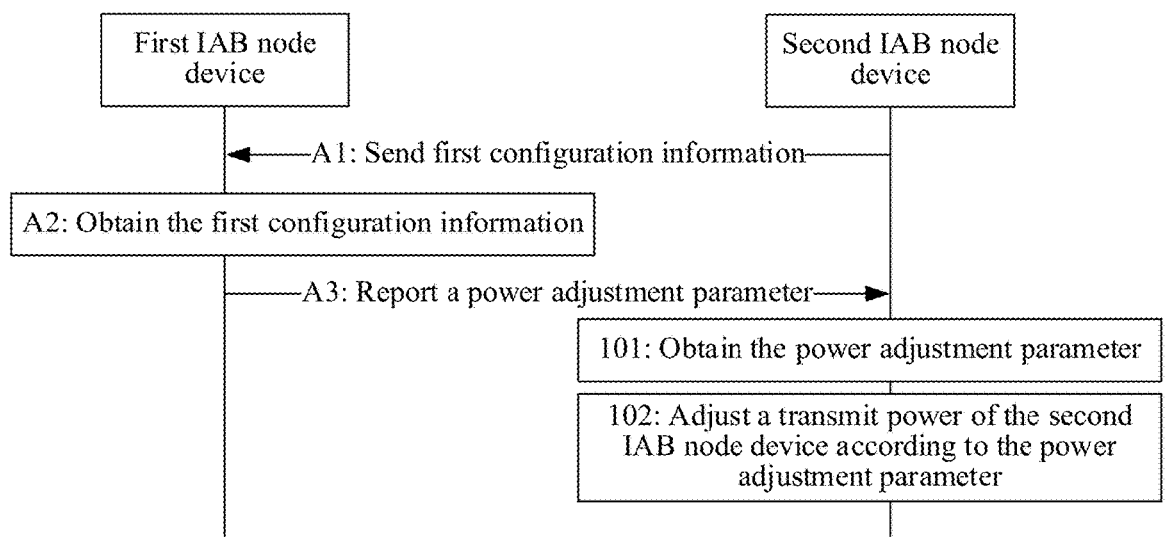
FIG. 7 is a schematic flowchart 4 of a power adjustment method according to an embodiment of the present disclosure.

For example, in this embodiment of the present disclosure, referring to FIG. 5, as shown in FIG. 7, before step 201, the power adjustment method provided in this embodiment of the present disclosure may further include the following steps:

Step A1: The second IAB node device sends first configuration information to the first IAB node device.

The first configuration information is used for configuring the first IAB node device to report a power adjustment parameter.

Step A2: The first IAB node device obtains the first configuration information.

Further, with reference to step A1 and step A2, step 201*a* may include step A3:

Step A3: The first IAB node device reports a power adjustment parameter to the target device according to the first configuration information.

Further, for example, in this embodiment of the present disclosure, the first configuration information is used for indicating at least one of the following: a reporting resource of the power adjustment parameter, a reporting carrier of the power adjustment parameter, or a reporting mode of the power adjustment parameter; and the reporting mode includes any one of the following: a periodic reporting mode, a semi-persistent reporting mode, or an aperiodic reporting mode.

Exemplarily, the reporting resource of the power adjustment parameter may be a resource of a Physical Uplink Control Channel (PUCCH) or a Physical Uplink Shared Channel (PUSCH).

Exemplarily, the reporting carrier of the power adjustment parameter may be at least one of the following: an RRC, a BAP Control PDU, a MAC CE, or UCI.

Exemplarily, the reporting mode of the power adjustment parameter includes at least one of the following: a periodic reporting mode, a semi-persistent (semi-persistent) reporting mode, an aperiodic reporting mode, or an event triggered reporting mode.

Exemplarily, for one or more of the reporting modes, the reporting resource can be configured.

Exemplarily, the IAB control node device/parent node device configures the reporting to indicate a reporting resource and/or a reporting parameter for the reporting.

Exemplarily, in a process of reporting an expected received power value by an MT of a first IAB node device (that is, an IAB-MT), the IAB-MT reports the received power value to the IAB control node device in a case that reporting is performed through RRC signaling, and the IAB-MT may directly report the received power value to a parent node device of the first IAB node device (that is, a second IAB node device) in a case that the reporting is performed through physical layer signaling/part of high layer signaling (for example, a Medium Access Control Control Element (MAC CE)).

Further, for example, in this embodiment of the present disclosure, in a case that the reporting mode of the power adjustment parameter includes the periodic reporting mode and/or the semi-persistent reporting mode, the first configuration information is used for indicating first signaling, where the first signaling is used for triggering the first IAB node device to report the power adjustment parameter.

Further, for example, in this embodiment of the present disclosure, in a case that the reporting mode includes the periodic reporting mode and/or the semi-persistent reporting mode, before step 201, the power adjustment method provided in this embodiment of the present disclosure further includes step B1:

Step B1: The first IAB node device receives first signaling.

Further, based on step A3, step 201 may include step B2:

Step B2: The first IAB node device reports the power adjustment parameter to the target device according to the first signaling.

Exemplarily, the first signaling includes Downlink Control Information (DCI) or a MAC CE.

Exemplarily, the DCI may be DCI scrambled by a target Radio Network Temporary Identifier (RNTI), and/or a target domain in the DCI or the MAC CE is used for triggering reporting the power adjustment parameter; or a DCI format of the DCI is a target DCI format.

Exemplarily, in the semi-persistent reporting mode or the aperiodic reporting mode, after receiving the first signaling, the first IAB node device may trigger, according to the first signaling, the first IAB node device to report the power adjustment parameter. In an example, a fixed field in the DCI may be used for triggering the first IAB node device to report the power adjustment parameter, or DCI scrambled by a specific RNTI may be used for triggering the first IAB node device to report the power adjustment parameter, or a new DCI format may be defined to trigger the first IAB node device to report the power adjustment parameter.

Exemplarily, the DCI used for triggering the first IAB node device to report the power adjustment parameter may be DCI that schedules a PDSCH/PUSCH, and the first signaling may be referred to as trigger signaling, where the trigger signaling may schedule the reporting resource.

Further, for example, in this embodiment of the present disclosure, before step A1, the power adjustment method provided in this embodiment of the present disclosure further includes step A4:

Step A4: The first IAB node device reports second signaling.

The second signaling is used for triggering the target device to configure the first configuration information for the IAB node device.

Exemplarily, during reporting the second signaling by the first IAB node device, the second signaling may be directly reported to the second IAB node device, or may be reported to the IAB control node device and then be reported to the second IAB node device through the IAB control node device. This is not limited in this embodiment of the present disclosure.

Further, for example, in this embodiment of the present disclosure, before step A1, the power adjustment method provided in this embodiment of the present disclosure further includes step A5:

Step A5: The second IAB node device receives the second signaling from the first IAB node device or an IAB control node device.

Further, based on step A5, step A1 may include step A11:

Step A11: The second IAB node device sends the first configuration information to the first IAB node device according to the second signaling.

In an example, a reporting condition of the second signaling includes any one of the following: the power adjustment parameter changes, or the power adjustment parameter is reported for the first time.

In an example, the second signaling may be Uplink Control Information (UCI), a MAC CE, RRC, or a BAP Control PDU.

For example, the IAB-MT may report a second signaling to suggest triggering a Channel State Information (CSI) reporting procedure, for example, a trigger condition of the signaling is defined as any one of the following: the received power value expected by the IAB-MT changes, or the received power value expected by the IAB-MT is reported for the first time.

For example, the IAB-MT may report the second signaling to suggest triggering the CSI reporting procedure, for example, the trigger condition may be that a received power value of the IAB-MT deviates from the expected received power value within a specific range, or the received power value expected by the IAB-MT changes. The range may be configured or may be specified in a protocol.

Further, for example, in this embodiment of the present disclosure, the first configuration information includes first CSI configuration information, where the first CSI configuration information is used for CSI reporting.

In an example, the CSI configuration information includes a target parameter, where the target parameter is used for reporting the power adjustment parameter. In view of this, step A3 may include step C:

Step C: The first IAB node device reports the power adjustment parameter to the target device according to the target parameter.

The target parameter is configured for the IAB node device by the IAB control node device, or the target parameter is configured for the IAB node device together with another parameter in the CSI configuration information by the IAB control node device.

In an example, when the power adjustment parameter is reported by using the CSI reporting procedure, the first IAB node device may add a new CSI report quantity for reporting the power adjustment parameter. For example, new reportQuantity is added to CSI-ReportConfig IE (referring to 3GPP TS 38.331). Further, the reportQuantity may be separately configured, and/or the reportQuantity is configured together with another reportQuantity, for example, cri-RSRP-P0, or ssb-Index-RSRP-P0 (where P0 is a reported power value).

In an example, when the power adjustment parameter is reported by using the CSI reporting procedure, the first IAB node device may calculate the reporting parameter based on measurement performed on a channel measurement resource. In other words, the first IAB node device may calculate the reporting parameter based on CSI-RS configuration indicated by a resourcesForChannelMeasurement field in the CSI-ReportConfig IE.

Further, for example, in this embodiment of the present disclosure, the first configuration information includes second CSI configuration information, where the second CSI configuration information is used for CSI measurement. In view of this, step A3 may include step A31 and step A32:

Step A31: The first IAB node device performs CSI measurement on a CSI channel measurement resource according to the second CSI configuration information, to obtain CSI measurement information.

Step A32: The first IAB node device reports the power adjustment parameter to the target device according to the CSI measurement information.

For example, in this embodiment of the present disclosure, step 201 may include step D:

Step D: The first IAB node device reports the power adjustment parameter to the target device in a case that a target event occurs, where the target event is used for triggering reporting the power adjustment parameter.

Further, for example, in this embodiment of the present disclosure, the target event includes any one of the following: the power adjustment parameter changes, or the power adjustment parameter is reported for the first time.

Exemplarily, when the power adjustment parameter is reported by using the CSI reporting procedure, the first IAB node device triggers, through the target event, the first IAB node device to actively report the power adjustment parameter, for example, defining the UCI, the MAC CE (BSR) or the RRC, and the BAP Control PDU for the reporting.

Exemplarily, the target event may be triggered by comparing a difference between an expected received power of the first IAB node device and an expected received power of the MT reported at the last time with a pre-configured threshold. For example, reporting of the expected received power value of the IAB-MT may be triggered in a case that an expected received power of the IAB-MT is higher than a preset threshold (threshold 1) of the expected received power value reported at the last time or is lower than a preset threshold (threshold 2) of the expected received power value reported at the last time.

Exemplarily, the target event may be that a received power value of the first IAB node device deviates from the expected received power value within a specific range, or the received power value expected by the first IAB node device changes. The range may be specified in a protocol, or may be configured by the second IAB node device or the IAB control node device.

Exemplarily, the reporting resource may be applied for through an SR process, or may use a scheduled UL resource. In an example, in a case that the expected received power value of the first IAB node device is reported for the first time, the reporting resource may be applied for through the SR process, or may use the scheduled UL resource.

It should be noted that, in a case that the power adjustment parameter is reported through the UCI, the reporting of the power adjustment parameter cannot be multiplexed with at least one of a Scheduling Request (SR), an Acknowledgement (ACK), or the CSI. In a case that multiplexing is allowed, the reporting of the power adjustment parameter is concatenated to at least one of the SR, the ACK, or the CSI.

For example, in this embodiment of the present disclosure, the power adjustment method provided in this embodiment of the present disclosure may further include step E:

Step E: The first IAB node device obtains application time corresponding to the power adjustment parameter.

For example, in this embodiment of the present disclosure, step 102 may include step F:

Step F: The second IAB node device adjusts the transmit power of the second IAB node device at application time corresponding to the power adjustment parameter according to the power adjustment parameter.

The application time corresponding to the power adjustment parameter includes a target moment and/or an application duration.

Further, for example, in this embodiment of the present disclosure, the target moment is used for indicating at least one of the following: the power adjustment parameter becomes applicable at the target moment, or the power adjustment parameter becomes applicable from N time unit(s) after the target moment.

Exemplarily, the application time needs to be determined in a case that the reporting/configuration of the target event is implemented through physical layer signaling/part of high layer signaling (for example, the DCI, the UCI, and the MAC CE). Further, the application time may be determined based on a reference point, and the reference point may be a transmission/receiving time for configuring/reporting the signaling or a transmission/receiving time for triggering the reported signaling.

Exemplarily, the target moment may be a current (sub-)slot or a symbol.

Exemplarily, the N time unit(s) may be N (sub-) slots, or N symbols, or N milliseconds (ms), or N nanoseconds (us), or N seconds (s). It should be noted that, N may be a specified/configured time, or a signaling processing time.

Exemplarily, the application duration may be predefined, or may be configured by the high layer signaling, or may be dynamically indicated by the high layer signaling, or may be dynamically indicated by the physical layer signaling.

Exemplarily, in a case that the time unit is the (sub-)slot/symbol, a reference search space (e.g., Subcarrier Spacing (SCS)) needs to be specified, for example, the reference SCS is an SCS of a Bandwidth Part (BWP) of the reported/configured signaling, or an SCSspecified, configured, or indicated in signaling.

In this embodiment of the present disclosure, a Parent node may semi-statically or dynamically adjust a downlink transmit power according to the expected received power value of the IAB-MT and/or a dynamic change of a channel between the Parent node and the IAB-MT, to eliminate interference caused by a transmitter to a receiver or caused by one receiver to the other receiver when the IAB-DU and the IAB-MT simultaneously perform transmission and reception (for example, the IAB-DU and the IAB-MT simultaneously perform reception, or one of the IAB-DU and the IAB-MT performs reception and the other performs transmission). In addition, the problem of PSD imbalance when the IAB-DU and the IAB-MT simultaneously perform reception can be overcome.

Figure 8:
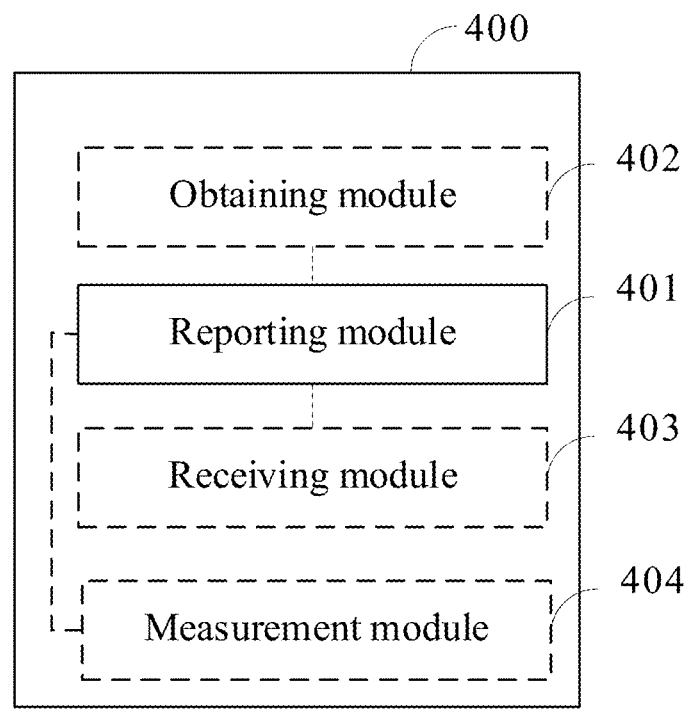
FIG. 8 is a schematic structural diagram 1 of an IAB node device according to an embodiment of the present disclosure.

FIG. 8 is a possible schematic structural diagram of an IAB node device that can implement an embodiment of the present disclosure. The IAB node device is a first IAB node device. As shown in FIG. 8, the first IAB node device 400 includes a reporting module 401. The reporting module 401 is configured to report a power adjustment parameter to a target device, where the power adjustment parameter is used for indicating a target power value; the power adjustment parameter is used for adjusting a transmit power of a second IAB node device; the target power value includes at least one of the following: a first power value or a second power value; the first power value is a received power value expected by the first IAB node device 400; the second power value is a transmit power value or a transmit power adjustment value of the second IAB node device suggested by the first IAB node device 400; the target device includes the second IAB node device or an IAB control node device; and the second IAB node device is a parent node device of the first IAB node device 400.

For example, in this embodiment of the present disclosure, the target power value includes at least one of the following: an RSRP, an RSSI, RSRQ, an SINR, an SNR, EPRE, or a PSD.

For example, in this embodiment of the present disclosure, the power adjustment parameter includes a power difference between a third power value and the target power value, where the third power value includes: a target power value initially reported or configured, a target power value reported or configured at the last time, and an actual power value.

For example, in this embodiment of the present disclosure, the power adjustment parameter includes a power value index of the target power value.

For example, in this embodiment of the present disclosure, as shown in FIG. 8, the first IAB node device 400 further includes an obtaining module 402, where the obtaining module 402 is configured to obtain first configuration information; and the reporting module 401 is further configured to report the power adjustment parameter to the target device according to the first configuration information obtained by the obtaining module 401.

For example, in this embodiment of the present disclosure, the first configuration information is used for indicating at least one of the following: a reporting resource of the power adjustment parameter, a reporting carrier of the power adjustment parameter, or a reporting mode of the power adjustment parameter; and the reporting mode includes any one of the following: a periodic reporting mode, a semi-persistent reporting mode, or an aperiodic reporting mode.

For example, in this embodiment of the present disclosure, as shown in FIG. 8, the first IAB node device 400 further includes a receiving module 403, where the receiving module 403 is configured to receive first signaling in a case that the reporting mode includes the periodic reporting mode and/or the semi-persistent reporting mode, where the first signaling is used for triggering reporting the power adjustment parameter; and the reporting module 401 is further configured to report the power adjustment parameter to the target device according to the first signaling received by the receiving module 403.

For example, in this embodiment of the present disclosure, the first signaling includes DCI or a MAC CE.

For example, in this embodiment of the present disclosure, the DCI is DCI scrambled by a target RNTI, or a target domain in the DCI or the MAC CE is used for triggering reporting the power adjustment parameter; or a DCI format of the DCI is a target DCI format.

For example, in this embodiment of the present disclosure, the reporting module 401 is further configured to report second signaling. The second signaling is used for triggering the target device to configure the first configuration information for the IAB node device.

For example, in this embodiment of the present disclosure, a reporting condition of the second signaling may include any one of the following: the power adjustment parameter changes, or the power adjustment parameter is reported for the first time.

For example, in this embodiment of the present disclosure, the first configuration information includes first CSI configuration information, where the first CSI configuration information is used for CSI reporting.

For example, in this embodiment of the present disclosure, the first CSI configuration information includes a target parameter, where the target parameter is used for reporting the power adjustment parameter; and the reporting module 401 is further configured to report the power adjustment parameter to the target device according to the target parameter. The target parameter is configured for the IAB node device by the IAB control node device, or the target parameter is configured for the IAB node device together with another parameter in the CSI configuration information by the IAB control node device.

For example, in this embodiment of the present disclosure, the first configuration information includes second CSI configuration information, where the second CSI configuration information is used for CSI measurement. As shown in FIG. 8, the first IAB node device 400 further includes a measurement module 404, where the measurement module 404 is configured for the reporting module 401 and is configured to perform CSI measurement on a CSI channel measurement resource according to the second CSI configuration information, to obtain CSI measurement information; and the reporting module 401 is further configured to report the power adjustment parameter to the target device according to the CSI measurement information obtained by the measurement module 404.

For example, in this embodiment of the present disclosure, the reporting module 401 is further configured to report the power adjustment parameter to the target device in a case that a target event occurs, where the target event is used for triggering reporting the power adjustment parameter.

For example, in this embodiment of the present disclosure, the target event includes any one of the following: the power adjustment parameter changes, or the power adjustment parameter is reported for the first time.

For example, in this embodiment of the present disclosure, the reporting module 401 is further configured to report the power adjustment parameter to the target device in at least one piece of third signaling at an initial access stage.

For example, in this embodiment of the present disclosure, the obtaining module 402 is further configured to obtain application time corresponding to the power adjustment parameter, where the application time includes a target moment and/or an application duration.

For example, in this embodiment of the present disclosure, the target moment is used for indicating at least one of the following: the power adjustment parameter becomes applicable at the target moment, or the power adjustment parameter becomes applicable from N time unit(s) after the target moment.

An embodiment of the present disclosure provides a first IAB node device, the first IAB node device reports a power adjustment parameter to a second IAB node device (that is, a parent node device of the first IAB node device), and the power adjustment parameter is used for indicating a received power value expected by the first IAB node device and/or a transmit power value or a transmit power adjustment value of the second IAB node device suggested by the first IAB node device, so that the first IAB node device can control a DL transmit power of the parent node device of the first IAB node device to the first IAB node device, to alleviate the problems of PSD imbalance and interference.

The processes in the foregoing method embodiments can be implemented by a terminal device provided in this embodiment of the present disclosure. To avoid repetition, details are not described herein again.

It is to be noted that, as shown in FIG. 8, a module absolutely included in the first IAB node device 400 is indicated by a solid-line box, for example, the reporting module 401; and modules that may or may not be included in the first IAB node device 400 are indicated by dashed-line boxes, for example, the obtaining module 402.

Figure 9:
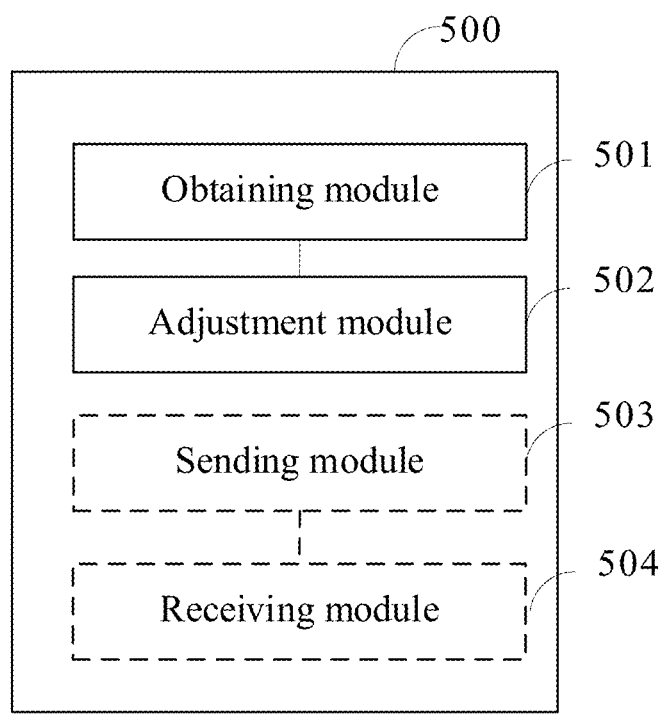
FIG. 9 is a schematic structural diagram 2 of an IAB node device according to an embodiment of the present disclosure.

FIG. 9 is a possible schematic structural diagram of another IAB node device that can implement an embodiment of the present disclosure. The IAB node device is a second IAB node device 500. As shown in FIG. 9, the second IAB node device 500 includes an obtaining module 501 and an adjustment module 502. The obtaining module 501 is configured to obtain a power adjustment parameter; and the adjustment module 502 is configured to adjust a transmit power of the second IAB node device 500 according to the power adjustment parameter obtained by the obtaining module 501. The power adjustment parameter is used for indicating a target power value; the target power value includes at least one of the following: a first power value or a second power value; the first power value is a received power value expected by a first IAB node device; the second power value is a transmit power value or a transmit power adjustment value of the second IAB node device 500 suggested by the first IAB node device; and the second IAB node device 500 is a parent node device of the first IAB node device.

For example, in this embodiment of the present disclosure, the target power value includes at least one of the following: an RSRP, an RSSI, RSRQ, an SINR, an SNR, EPRE, or a PSD.

For example, in this embodiment of the present disclosure, the power adjustment parameter includes a power difference between a third power value and the target power value, where the third power value includes: a power value initially reported or configured, a power value reported or configured at the last time, and an actual power value.

For example, in this embodiment of the present disclosure, the power adjustment parameter includes a power value index of the target power value.

For example, in this embodiment of the present disclosure, as shown in FIG. 9, the second IAB node device 500 further includes a sending module 503. The sending module 503 is configured to send first configuration information to the first IAB node device, where the first configuration information is used for configuring the first IAB node device to report a power adjustment parameter.

For example, in this embodiment of the present disclosure, the first configuration information is used for indicating at least one of the following: a reporting resource of the power adjustment parameter, a reporting carrier of the power adjustment parameter, or a reporting mode of the power adjustment parameter; and the reporting mode includes any one of the following: a periodic reporting mode, a semi-persistent reporting mode, or an aperiodic reporting mode.

For example, in this embodiment of the present disclosure, in a case that the reporting mode includes the periodic reporting mode and/or the semi-persistent reporting mode, the first configuration information is used for indicating first signaling, where the first signaling is used for triggering the first IAB node device to report the power adjustment parameter.

For example, in this embodiment of the present disclosure, the first signaling includes DCI or a MAC CE.

For example, in this embodiment of the present disclosure, the DCI is DCI scrambled by a target RNTI, or a target domain in the DCI is used for triggering reporting the power adjustment parameter; or a DCI format of the DCI is a target DCI format.

For example, in this embodiment of the present disclosure, as shown in FIG. 9, the second IAB node device 500 further includes a receiving module 504. The receiving module 504 is configured to receive second signaling from the first IAB node device or an IAB control node device; and the sending module 503 is further configured to first configuration information to the first IAB node device according to the second signaling.

For example, in this embodiment of the present disclosure, the first configuration information includes first CSI configuration information, where the first CSI configuration information is used for CSI reporting.

For example, in this embodiment of the present disclosure, the first configuration information includes second CSI configuration information, where the second CSI configuration information is used for CSI measurement.

For example, in this embodiment of the present disclosure, the adjustment module 502 is further configured to adjust the transmit power of the second IAB node device 500 at application time corresponding to the power adjustment parameter according to the power adjustment parameter, where the application time includes a target moment and/or an application duration.

For example, in this embodiment of the present disclosure, the target moment is used for indicating at least one of the following: the power adjustment parameter becomes applicable at the target moment, or the power adjustment parameter becomes applicable from N time unit(s) after the target moment.

An embodiment of the present disclosure provides a second IAB node device, the second IAB node device receives a power adjustment parameter reported by a first IAB node device (that is, a child node device of the second IAB node device), and the power adjustment parameter is used for indicating a received power value expected by the first IAB node device and/or a transmit power value or a transmit power adjustment value of the second IAB node device suggested by the first IAB node device, so that the second IAB node device can control a DL transmit power of the second IAB node device to the first IAB node device, to alleviate the problems of PSD imbalance and interference.

The processes in the foregoing method embodiments can be implemented by a terminal device provided in this embodiment of the present disclosure. To avoid repetition, details are not described herein again.

It is to be noted that, as shown in FIG. 9, modules absolutely included in the second IAB node device 500 are indicated by solid-line boxes, for example, the obtaining module 501; and modules that may or may not be included in the second IAB node device 500 are indicated by dashed-line boxes, for example, the sending module 503.

Figure 10:
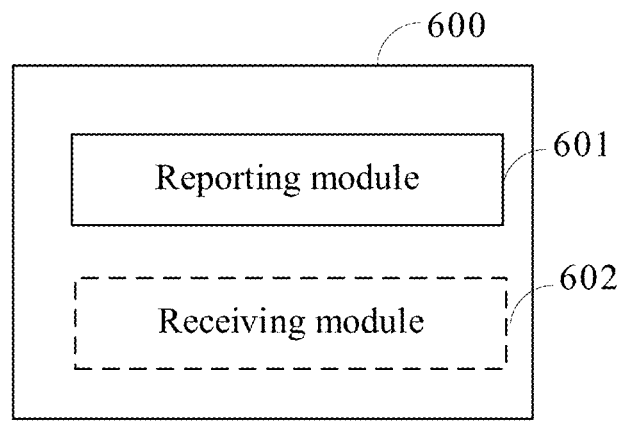
FIG. 10 is a schematic structural diagram 3 of an IAB node device according to an embodiment of the present disclosure.

FIG. 10 is a possible schematic structural diagram of another IAB node device that can implement an embodiment of the present disclosure. The IAB node device is an IAB control node device. As shown in FIG. 10, the IAB control node device 600 includes a reporting module 601. The reporting module 601 is configured to report a power adjustment parameter to a second IAB node device, where the power adjustment parameter is used for indicating a target power value; the power adjustment parameter is used for adjusting a transmit power of a second IAB node device; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

For example, in this embodiment of the present disclosure, as shown in FIG. 10, the IAB control node device 600 further includes a receiving module 602. The receiving module 602 is configured to receive the power adjustment parameter from the first IAB node device.

For example, in this embodiment of the present disclosure, the power adjustment parameter is autonomously determined by the IAB control node device 600.

An embodiment of the present disclosure provides an IAB control node device, the IAB control node device reports a power adjustment parameter to a second IAB node device, and the power adjustment parameter is used for indicating a received power value expected by the first IAB node device and/or a transmit power value or a transmit power adjustment value of the second IAB node device suggested by the first IAB node device, so that the IAB control node device can control a DL transmit power of the second IAB node device to the first IAB node device, to alleviate the problems of PSD imbalance and interference.

The processes in the foregoing method embodiments can be implemented by a terminal device provided in this embodiment of the present disclosure. To avoid repetition, details are not described herein again.

It is to be noted that, as shown in FIG. 10, a module absolutely included in the IAB control node device 600 is indicated by a solid-line box, for example, the reporting module 601. The processes in the foregoing method embodiments can be implemented by a terminal device provided in this embodiment of the present disclosure. To avoid repetition, details are not described herein again.

Figure 11:
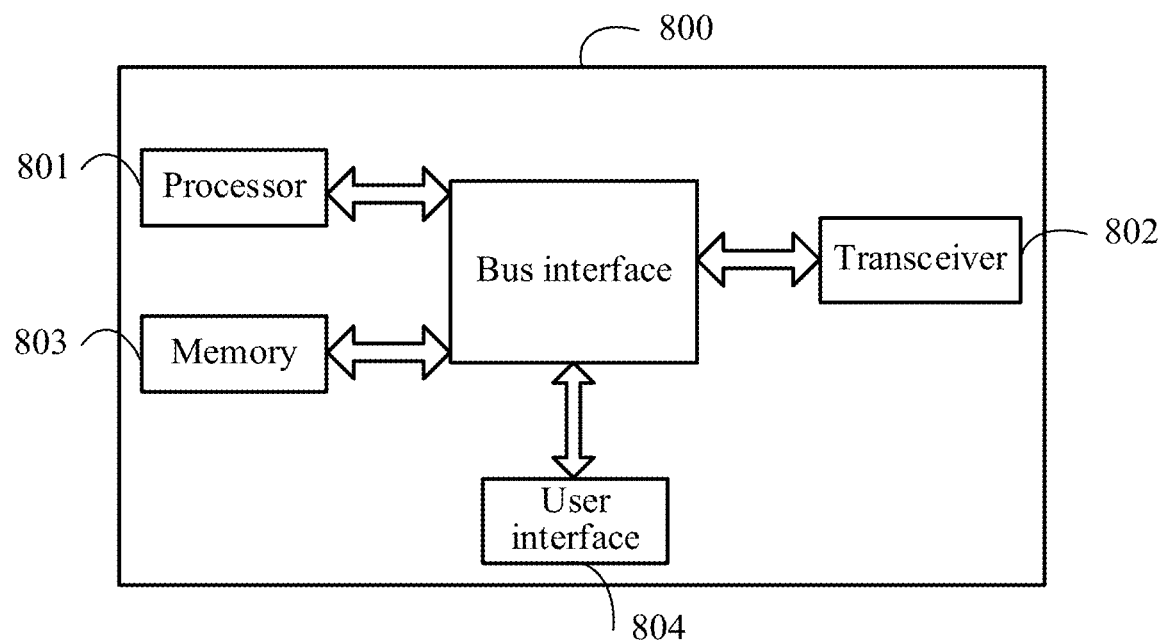
FIG. 11 is a schematic structural diagram of hardware of an IAB node device according to an embodiment of the present disclosure.

FIG. 11 is a schematic structural diagram of hardware of an IAB node device that can implement an embodiment of the present disclosure. The IAB node device 800 includes: a processor 801, a transceiver 802, a memory 803, a user interface 804, and a bus interface.

In a case that the IAB node device is a first IAB node device, the transceiver 802 is configured to report a power adjustment parameter to a target device, where the power adjustment parameter is used for indicating a target power value; the power adjustment parameter is used for adjusting a transmit power of a second IAB node device; the target power value includes at least one of the following: a first power value or a second power value; the first power value is a received power value expected by a first IAB node device; the second power value is a transmit power value or a transmit power adjustment value of the second IAB node device suggested by the first IAB node device; the target device includes the second IAB node device or an IAB control node device; and the second IAB node device is a parent node device of the first IAB node device.

An embodiment of the present disclosure provides a first IAB node device, the first IAB node device reports a power adjustment parameter to a second IAB node device (that is, a parent node device of the first IAB node device), and the power adjustment parameter is used for indicating a received power value expected by the first IAB node device and/or a transmit power value or a transmit power adjustment value of the second IAB node device suggested by the first IAB node device, so that the first IAB node device can control a DL transmit power of the parent node device of the first IAB node device to the first IAB node device, to alleviate the problems of PSD imbalance and interference.

In a case that IAB node device is a second IAB node device, the processor 801 is configured to obtain a power adjustment parameter, and adjust the transmit power of the second IAB node device according to the power adjustment parameter, where the power adjustment parameter is used for indicating a target power value; the target power value includes at least one of the following: a first power value or a second power value; the first power value is a received power value expected by a first IAB node device; the second power value is a transmit power value or a transmit power adjustment value of the second IAB node device suggested by the first IAB node device; and the second IAB node device is a parent node device of the first IAB node device.

An embodiment of the present disclosure provides a second IAB node device, the second IAB node device receives a power adjustment parameter reported by a first IAB node device (that is, a child node device of the second IAB node device), and the power adjustment parameter is used for indicating a received power value expected by the first IAB node device and/or a transmit power value or a transmit power adjustment value of the second IAB node device suggested by the first IAB node device, so that the second IAB node device can control a DL transmit power of the second IAB node device to the first IAB node device, to alleviate the problems of PSD imbalance and interference.

In a case that the IAB node device is an IAB control node device, the transceiver 802 is configured to report a power adjustment parameter to a second IAB node device. The power adjustment parameter is used for indicating a target power value; the power adjustment parameter is used for adjusting a transmit power of the second IAB node device; the target power value includes at least one of the following: a first power value or a second power value; and the first power value is a received power value expected by a first IAB node device;

An embodiment of the present disclosure provides an IAB control node device, the IAB control node device reports a power adjustment parameter to a second IAB node device, and the power adjustment parameter is used for indicating a received power value expected by the first IAB node device and/or a transmit power value or a transmit power adjustment value of the second IAB node device suggested by the first IAB node device, so that the IAB control node device can control a DL transmit power of the second IAB node device to the first IAB node device, to alleviate the problems of PSD imbalance and interference.

In this embodiment of the present disclosure, in FIG. 11, a bus architecture may include any quantity of interconnected buses and bridges, and connects together circuits that are of one or more processors represented by the processor 801 and of a memory represented by the memory 803. The bus architecture may further connect various other circuits of a peripheral, a voltage regulator, a power management circuit, and the like. This is well known in the art, and therefore, no further description is provided in this specification. The bus interface provides an interface between the bus and the transceiver. The transceiver 802 may be a plurality of components including a transmitter and a receiver, and provide a unit configured to communicate with various other devices over a transmission medium. For different user equipment, the user interface 804 may be an interface capable of externally or internally connecting a required device, the connected device includes, but not limited to, a keypad, a display, a speaker, a microphone, and a joystick. The processor 801 is responsible for the management of the bus architecture and normal processing, and the memory 803 may store data used when the processor 801 performs an operation.

In addition, the IAB node device 800 further includes some functional modules that are not shown, which are not described herein again.

For example, an embodiment of the present disclosure further provides an IAB node device, including a processor, a memory, and a computer program stored in the memory and executable by the processor, the computer program, when executed by the processor, implementing the processes of the power adjustment method in the foregoing embodiments, which can achieve the same technical effects. To avoid repetition, details are not described herein again.

An embodiment of the present disclosure further provides a computer-readable storage medium, storing a computer program, the computer program, when executed by a processor, implementing the processes of the power adjustment method in the foregoing embodiments, which can achieve the same technical effects. To avoid repetition, details are not described herein again. The computer-readable storage medium includes, for example, a Read-Only Memory (ROM), a Random Access Memory (RAM), a magnetic disk, or an optical disc.

It is to be noted that, the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. The embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, an air conditioner, a network device, or the like) to perform the methods described in the embodiments of the present disclosure.

Although embodiments of the present disclosure have been described above with reference to the accompanying drawings, this application is not limited to the specific implementations described above, and the specific implementations described above are merely exemplary and not limitative. A person of ordinary skill in the art may make various variations under the enlightenment of the present disclosure without departing from the spirit of this application and the protection scope of the claims, and such variations shall all fall within the protection scope of this application.

What is claimed is:

1. A power adjustment method, performed by a first Integrated Access Backhaul (IAB) node device, comprising:
obtaining first configuration information, wherein the first configuration information comprises first Channel State Information (CSI) configuration information, wherein the first CSI configuration information is used for CSI reporting, and the first CSI configuration information comprises a target parameter, wherein the target parameter is used for reporting the power adjustment parameter; and
reporting a power adjustment parameter to a target device according to the first configuration information, wherein
the power adjustment parameter is used for indicating a target power value;
the power adjustment parameter is used for adjusting a transmit power of a second IAB node device;
the target power value comprises at least one of the following: a first power value or a second power value;
the first power value is a received power value expected by a first IAB node device;
the second power value is a transmit power value or a transmit power adjustment value of the second IAB node device suggested by the first IAB node device;
the target device comprises the second IAB node device or an IAB control node device; and
the second IAB node device is a parent node device of the first IAB node device,
wherein the reporting the power adjustment parameter to the target device according to the first configuration information comprises:
reporting the power adjustment parameter to the target device according to the target parameter, wherein
the target parameter is configured for the first IAB node device by the IAB control node device, or the target parameter is configured for the first IAB node device together with another parameter in the CSI configuration information by the IAB control node device.

2. The power adjustment method according to claim 1, wherein the target power value comprises at least one of the following: a Reference Signal Received Power (RSRP), a Received Signal Strength Indication (RSSI), Reference Signal Received Quality (RSRQ), a Signal to Interference plus Noise Ratio (SINR), a Signal-to-Noise Ratio (SNR), Energy Per Resource Element (EPRE), or a Power Spectrum Density (PSD).

3. The power adjustment method according to claim 1, wherein the power adjustment parameter comprises a power difference between a third power value and the target power value, wherein the third power value comprises: a target power value initially reported or configured, a target power value reported or configured at the last time, and an actual power value.

4. The power adjustment method according to claim 1, wherein the power adjustment parameter comprises a power value index of the target power value.

5. The power adjustment method according to claim 1, wherein the first configuration information is further used for indicating at least one of the following: a reporting resource of the power adjustment parameter, a reporting carrier of the power adjustment parameter, or a reporting mode of the power adjustment parameter; and the reporting mode comprises any one of the following: a periodic reporting mode, a semi-persistent reporting mode, or an aperiodic reporting mode.

6. The power adjustment method according to claim 5, wherein when the reporting mode comprises the periodic reporting mode or the semi-persistent reporting mode, before the reporting a power adjustment parameter to a target device, the method further comprises:
receiving first signaling, wherein the first signaling is used for triggering reporting the power adjustment parameter; and
the reporting a power adjustment parameter to a target device comprises:
reporting the power adjustment parameter to the target device according to the first signaling.

7. The power adjustment method according to claim 6, wherein the first signaling comprises Downlink Control Information (DCI) or Medium Access Control Control Element (MAC CE).

8. The power adjustment method according to claim 7, wherein the DCI is DCI scrambled by a target Radio Network Temporary Identifier (RNTI), or a target domain in the DCI or the MAC CE is used for triggering reporting the power adjustment parameter; or a DCI format of the DCI is a target DCI format.

9. The power adjustment method according to claim 1, wherein before the obtaining first configuration information, the method further comprises:
reporting second signaling, wherein
the second signaling is used for triggering the target device to configure the first configuration information for the IAB node device.

10. The power adjustment method according to claim 9, wherein a reporting condition of the second signaling comprises any one of the following:
the power adjustment parameter changes; or
the power adjustment parameter reported for the first time.

11. The power adjustment method according to claim 1, wherein the first configuration information comprises further second CSI configuration information, wherein the second CSI configuration information is used for CSI measurement, and
the reporting the power adjustment parameter to the target device according to the first configuration information comprises:
performing CSI measurement on a CSI channel measurement resource according to the second CSI configuration information, to obtain CSI measurement information; and
reporting the power adjustment parameter to the target device according to the CSI measurement information.

12. The power adjustment method according to claim 1, wherein the reporting a power adjustment parameter to a target device comprises:

reporting the power adjustment parameter to the target device when a target event occurs, wherein the target event is used for triggering reporting the power adjustment parameter; or reporting the power adjustment parameter to the target device in at least one piece of third signaling at an initial access stage.

13. The power adjustment method according to claim 12, wherein the target event comprises any one of the following:
the power adjustment parameter changes; or
the power adjustment parameter reported for the first time.

14. The power adjustment method according to claim 1, further comprising:
obtaining application time corresponding to the power adjustment parameter, wherein
the application time comprises a target moment or an application duration.

15. The power adjustment method according to claim 14, wherein the target moment is used for indicating at least one of the following:
the power adjustment parameter becoming applicable at the target moment; or
the power adjustment parameter becoming applicable from N time unit(s) after the target moment.

16. An Integrated Access Backhaul (IAB) node device, comprising a memory having a computer program stored thereon; and a processor, wherein the computer program, when executed by the processor, causes the processor to perform a power adjustment method, comprising:
obtaining first configuration information, wherein the first configuration information comprises first Channel State Information (CSI) configuration information, wherein the first CSI configuration information is used for CSI reporting, and the first CSI configuration information comprises a target parameter, wherein the target parameter is used for reporting the power adjustment parameter; and
reporting a power adjustment parameter to a target device according to the first configuration information, wherein
the power adjustment parameter is used for indicating a target power value;
the power adjustment parameter is used for adjusting a transmit power of a second IAB node device;
the target power value comprises at least one of the following: a first power value or a second power value;
the first power value is a received power value expected by a first IAB node device;
the second power value is a transmit power value or a transmit power adjustment value of the second IAB node device suggested by the first IAB node device;
the target device comprises the second IAB node device or an IAB control node device; and
the second IAB node device is a parent node device of the first IAB node device,
wherein the reporting the power adjustment parameter to the target device according to the first configuration information comprises:
reporting the power adjustment parameter to the target device according to the target parameter, wherein
the target parameter is configured for the first IAB node device by the IAB control node device, or the target parameter is configured for the first IAB node device together with another parameter in the CSI configuration information by the IAB control node device.

17. A first Integrated Access Backhaul (IAB) control node device, comprising a memory having a computer program stored thereon; and a processor, wherein the computer program, when executed by the processor, causes the processor to perform a power adjustment method, comprising:
obtaining first configuration information, wherein the first configuration information comprises first Channel State Information (CSI) configuration information, wherein the first CSI configuration information is used for CSI reporting, and the first CSI configuration information comprises a target parameter, wherein the target parameter is used for reporting the power adjustment parameter; and
reporting a power adjustment parameter to a second IAB node device according to the first configuration information, wherein
the power adjustment parameter is used for indicating a target power value;
the power adjustment parameter is used for adjusting a transmit power of the second IAB node device;
the target power value comprises at least one of the following: a first power value or a second power value;
the first power value is a received power value expected by the first IAB node device;
the second power value is a transmit power value or a transmit power adjustment value of the second IAB node device suggested by the first IAB node device; and
the second IAB node device is a parent node device of the first IAB node device,
wherein the reporting the power adjustment parameter to the second IAB node device according to the first configuration information comprises:
reporting the power adjustment parameter to the second IAB node device according to the target parameter, wherein
the target parameter is configured for the first IAB node device by the second IAB node device, or the target parameter is configured for the first IAB node device together with another parameter in the CSI configuration information by the second IAB node device.

* * * * *